United States Patent
Anderson

(10) Patent No.: US 6,634,837 B1
(45) Date of Patent: Oct. 21, 2003

(54) CERAMIC CUTTING INSERT OF POLYCRYSTALLINE TUNGSTEN CARBIDE

(75) Inventor: Linwood Anderson, Roscoe, IL (US)

(73) Assignee: Cerbide Corporation, Clifton Park, NY (US)

( * ) Notice: Subject to any disclaimer, the term of this patent is extended or adjusted under 35 U.S.C. 154(b) by 0 days.

(21) Appl. No.: 09/699,659

(22) Filed: Oct. 30, 2000

(51) Int. Cl.⁷ .......................... B23P 15/28; C25D 11/02
(52) U.S. Cl. ................. 407/118; 407/119; 428/698
(58) Field of Search ................. 407/118, 119; 408/144, 145; 428/216, 469, 697, 698, 701; 51/309

(56) References Cited

U.S. PATENT DOCUMENTS

| | | | |
|---|---|---|---|
| 3,383,748 A | | 5/1968 | Jones et al. |
| 3,745,623 A | * | 7/1973 | Wentorf et al. ............. 407/119 |
| 3,762,005 A | | 10/1973 | Erkfritz |
| 4,056,871 A | | 11/1977 | Bator |
| 4,087,193 A | | 5/1978 | Mundy |
| 4,126,652 A | | 11/1978 | Oohara et al. |
| 4,146,379 A | | 3/1979 | Copley et al. |

(List continued on next page.)

FOREIGN PATENT DOCUMENTS

| | | |
|---|---|---|
| EP | 0 360 567 | 3/1990 |
| EP | 0 476 632 | 3/1992 |
| EP | 0 532 802 | 3/1993 |

OTHER PUBLICATIONS

International Search Report mailed Jan. 24, 2003.
Evans (1979). "Impact Damage Mechanics: Solid Projectiles" *Treatise on Materials Science and Technology* 16: 63–65.
Lancster (1987). "Abrasive Wear," *Tribology in Particulate Technology*, Chapter 4.1: 328–329 & 332–333.
Almond et al. (1987). "Some Characteristics of Very–Fine–Trained Hardmetals" *Metal Powder Report* 42(No. 7,8): 512–516.
Hojo, et al. (1980). "The Sinterability of Ultrafine WC Powders Obtained by a CVD Method" *Journal of Materials Science* 15: 2335 –2344.

*Primary Examiner*—A. L. Wellington
*Assistant Examiner*—Brian D. Walsh
(74) *Attorney, Agent, or Firm*—Mintz, Levin, Cohn, Ferris, Glovsky and Popeo, P.C.; Ivor R. Elrifi, Esq.; Brian P. Hopkins, Esq.

(57) ABSTRACT

A polycrystalline tungsten carbide ceramic cutting insert with chip control is disclosed for high speed machining.

13 Claims, 1 Drawing Sheet

U.S. PATENT DOCUMENTS

| | | |
|---|---|---|
| 4,162,301 A | 7/1979 | Hamling |
| 4,247,232 A | 1/1981 | McCreery et al. |
| 4,256,496 A | 3/1981 | Brandstatter |
| 4,318,645 A | 3/1982 | McCreery |
| 4,340,324 A | 7/1982 | McCreery |
| 4,588,332 A | 5/1986 | Komanduri et al. |
| 4,664,899 A | 5/1987 | Kimmel et al. |
| 4,744,943 A | 5/1988 | Timm |
| 4,753,678 A | 6/1988 | Maruyama et al. |
| 4,828,584 A | 5/1989 | Cutler |
| 4,945,073 A | 7/1990 | Dubensky et al. |
| 5,026,960 A | 6/1991 | Slutz et al. |
| 5,089,447 A | 2/1992 | Timm et al. |
| 5,141,367 A | 8/1992 | Beeghly et al. |
| 5,215,945 A | 6/1993 | Dubensky et al. |
| 5,330,296 A | 7/1994 | Beeghly et al. |
| 5,334,561 A | 8/1994 | Matsui et al. |
| 5,350,258 A | 9/1994 | Beeghly et al. |
| 5,434,112 A | 7/1995 | Matsui et al. |
| 5,476,025 A | 12/1995 | Beeghly et al. |
| 5,563,107 A | 10/1996 | Dubensky et al. |
| 5,612,264 A | 3/1997 | Nilsson et al. |
| 5,628,590 A | 5/1997 | Beeghly et al. |
| 5,681,783 A | 10/1997 | Nilsson et al. |
| 5,709,907 A * | 1/1998 | Battaglia et al. ......... 427/126.1 |
| 5,746,803 A | 5/1998 | Dunmead et al. |
| 5,773,735 A | 6/1998 | Dubensky et al. |
| 5,827,017 A | 10/1998 | Tagstrom et al. |
| 5,919,428 A | 7/1999 | Gao et al. |
| 6,007,598 A | 12/1999 | Dunmead et al. |
| 6,033,789 A | 3/2000 | Saveker et al. |

* cited by examiner

CERAMIC CUTTING INSERT OF POLYCRYSTALLINE TUNGSTEN CARBIDE

FIELD OF THE INVENTION

This invention relates to the field of ceramics and particularly to dense polycrystalline tungsten carbide inserts with chip control.

BACKGROUND OF THE INVENTION

In the machining process, it is important for the cutting tool to work effectively at high speeds and to have a long tool life. In order for the cutting tool to be effective, it must be made of a material which results in the tool having a high heat hardness and a high transverse rupture strength and fracture toughness, and it must also have a design sufficient to control the flow of chips which are formed in the machining process and to reduce the cutting forces.

Chip control is an important element of the machining process, in order to break up the length of undesirably long chips which may be formed in the machining process. In high speed machining, if the strip taken off from the workpiece by the cutting insert is not broken up, the strip can interfere with the machining process in a variety of ways. For example, an undesirably long chip can be re-cut and welded onto a portion of the workpiece, thereby causing poor surface conditions on the workpiece. An undesirably long chip, if not broken under chip control, can also cause breakage of the machining tool itself. Additionally, undesirably long chips can feed into the tool holder or other portions of the machine and cause difficulties, e.g., damaging parts of the tool holder or obstructing visibility of the working area. Further, long ribbons are difficult to handle and can represent a safety hazard to the machine operator. Accordingly, there is a need in the high speed machining process to provide chip control. One method for controlling chip production is to incorporate an insert into the cutting tool, with the insert providing the means for chip control. Many different types of ceramic cutting tools with chip control inserts have been described, including those in U.S. Pat. Nos. 5,628,590; 5,141,367; and 5,330,296, the contents of which are hereby incorporated in their entirety.

In addition to chip control, another important aspect of cutting tools are the materials of which they are made. Cutting tools have been made with ceramics and ceramic-metal composites ("cermets"), including tungsten carbide ("WC"). Early work with WC focused upon densifying WC by heating to a temperature of, for example, 2,000° C. The densified material was judged unsuitable for use in applications requiring toughness, such as in cutting tools. The unsuitability stemmed largely from the densified material's excessively brittle character.

Efforts to overcome or offset some of the brittleness led to incorporation of an amount of a metal by admixing powdered metal and WC powder to form a composite and densifying the composite at a temperature above that at which the metal melts. The metal, most frequently an iron group metal (iron, cobalt or nickel), was added to impart some of its ductility to the composite. The densified composites, also known as cemented carbides, cermets and hard metals, have been used extensively for several decades in machining tools. In order to increase the cutting speed and cutting efficiency, a variety of additions have been made to the composition of ceramic cutting tools.

In general, hardness of the cermets, (i.e., wear resistance and strength and toughness, i.e., fracture resistance of a hard alloy) can be changed by tungsten carbide particle size, cobalt content and additional amounts of other carbides. The resulting hardened alloy has been widely used for various purposes. However, in formulating these materials, there is a tendency that if wear resistance is heightened, fracture resistance is lowered, and conversely, if fracture resistance is heightened, wear resistance is lowered. Therefore, in the design of cermet cutting tools, there has been encountered the problem of improving one material property at the expense of another material property by adding cobalt or another iron group that will plastically deform in the heat of high speed machining.

There have been many attempts to solve this problem, including removing the machining equipment from use and reprofiling the cemented carbide cutting tool in order to reestablish its desired properties and scrapping the used cemented carbide portion and inserting a new cemented carbide portion with the desired properties. There currently exists a need for machining tools with chip control which can maintain the desired machining properties of wear resistance and breakage resistance during high heat high speed machining.

Although cermets and WC have been used extensively in the design of cutting tools, there still has not been a satisfactory resolution to the problem of tailoring the composition of the cermet or WC in order to maximize efficiency of the cutting tool. The present invention solves this problem by incorporating into a machining tool a chip control insert made of WC. Such inserts have not been previously used, and such inserts maximize the efficiency of machining tools.

SUMMARY OF THE INVENTION

Cutting tool inserts with chip control composed of essentially dense, fine grained polycrystalline, tungsten carbide (WC) are included in the present invention.

According to the present invention, the ceramic cutting insert for high speed machining includes a cutting edge, a rake face with a chip control groove surface, a flank face and the cutting edge that is formed at the juncture of the flank face and the rake face.

These components are made by ceramic processing techniques and result in a ceramic body which has a density of greater than 95% of its theoretical density with substantially all grains having an average size of 0.001 to 20 micrometers.

In other aspects the insert is comprised of polycrystalline tungsten carbide of at least 98.5% by volume tungsten carbide. In another aspect an iron group, e.g. cobalt is present in the ceramic body from 0.01% to 1.5% by volume.

A further aspect of the present invention is to control the grain size of the tungsten carbide by adding an inert second phase such as refractory oxides, carbides, nitrides or borides.

The ceramic articles of this invention are particularly useful as wear parts, especially as cutting tools for a wide variety of materials, including the machining titanium metals and alloys of titanium which have a very high content of titanium, cast iron, aluminum, high nickel alloys, stainless steels, wood machining-cutting, and high speed machining of steels.

DETAILED DESCRIPTION OF THE INVENTION

It is the primary object of the invention to make a molded polycrystalline tungsten carbide ceramic cutting insert having a chip control structure. In drilling operations, chip control is important so that drilling efficiency is achieved and tool insert damage does not result. Incorporating chip breaker grooves or lands on the cutting insert blank allows the strip taken off of the workpiece to be broken up into short pieces. These small chips will readily fall away from the machining region into a receiving space or containers, so that the chips are contained and can be removed from the machine tool.

Figure 1A:
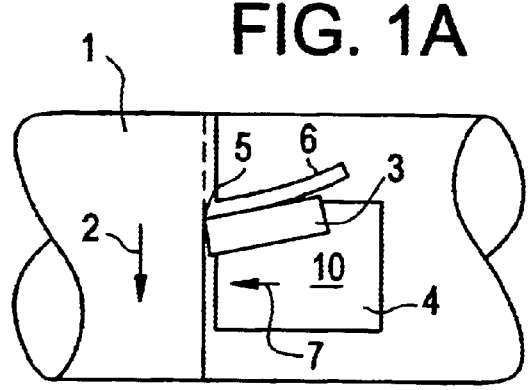
FIG. 1. is an illustration of types of chips that can be formed during machining. Panel A illustrates the chips formed using a cutting tool with no chip control. Panel B illustrates the chips formed using a cutting tool with chip control. Panel C is an illustration of the types of chips formed when high speed machining.
Figure 1B:
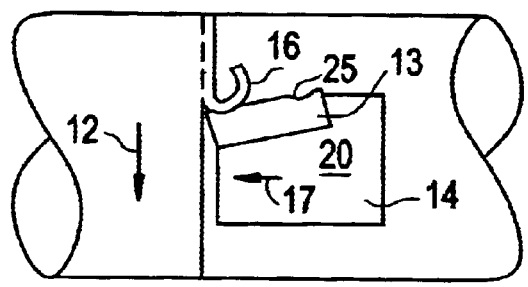
Figure 1C:
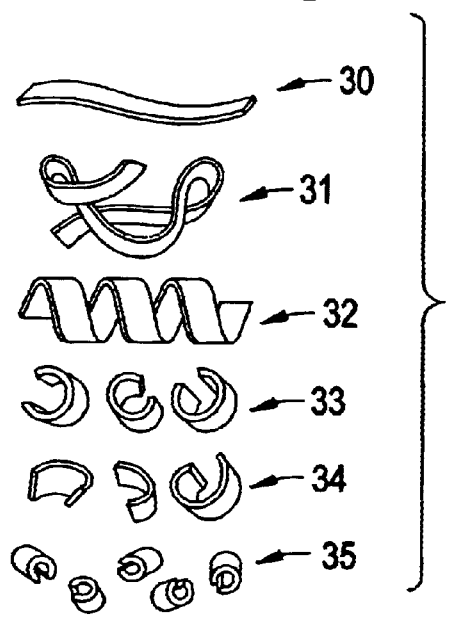

Referring to FIG. 1, panel A shows a view of a metal workpiece 1 in contact with a ceramic cutting insert 10. The workpiece can rotate in the direction of arrow 2, while the cutting insert 10 can be fed in the direction of arrow 7. The ceramic cutting insert 10 is formed by a rake face 3 and a flank face 4, the juncture of which forms a cutting edge 5. The rake face 3 in panel A lacks a chip control groove surface and therefore forms a metal chip 6 corresponding to any one of 30 (straight chip), 31 (snarling chip), or 35 (tight chip) in FIG. 1, panel C. As previously indicated, chips 30, 31 and 35 are undesirable because they can obstruct visibility of the working are breakage of the machine too itself by wedging between the cutting insert and the workpiece.

FIG. 1 panel B shows the metal workpiece of panel A in contact with an embodiment of a ceramic cutting insert 20 having a composition of materials contemplated by the present invention, which imparts wear resistance and breakage resistance to the ceramic cutting insert 20 during high heat speed machining. As in panel A, the workpiece in the direction of arrow 12, while the cutting insert 20 can be fed in the direction of arrow 17. The ceramic, cutting insert 20 is formed by a rake face 13 and a flank face 14, the juncture of which forms cutting edge 15. In contrast to the rake face 3 in panel A, the rake face 13 in panel B possesses a chip control groove surface 25 and therefore forms a metal chip 16 corresponding to any one of 32 (infinite helix chip), 33 (full turn chip), or 34 (half turn chip) in FIG. 1, panel C. Chips 32, 33, and 34 are desirable because they readily fall way from the machining region and do not obstruct the visibility of the working area.

Previously, polycrystalline tungsten carbide has not been utilized in the preparation of cutting tool inserts with chip control because tungsten carbide was not thought to have the toughness, i.e. fracture resistance, and hardness, i.e., wear resistance, required for inserts with chip control. Toughness and hardness can be altered by the addition of an iron group such as cobalt. However, cobalt melts at the high heat of high speed machining, making these formulations unsuitable for the manufacturing inserts with chip controls. Surprisingly, by varying polycrystalline tungsten carbide powder size, percentage of cobalt, temperature and pressure, the present invention provides a polycrystalline tungsten carbide formulation capable of being molded (i.e., in punches and dies) into cutting tools with chip control that have increased toughness and hardness suitable for high speed machining. The present invention may be utilized with a variety of insert chip control designs, such as those shown in U.S. Pat. Nos. 5,141,367; 4,318,645; 4,340,324; 4,247,232; 4,087,193; 4,056,871 and 3,383,748.

U.S. Pat. Nos. 5,563,107 and 4,828,584 include various examples of tungsten carbide ceramic materials which have been utilized in the preparation of cutting tools and are incorporated herein by reference. Until the present invention, however, such materials were not used in the production of inserts with chip control.

Tungsten carbide (WC) ceramics of the present invention can be tailored for use in particular applications by an appropriate choice of starting WC powder size and by controlling densification conditions control grain growth.

Desirable starting powder sizes fall within a range of from greater than 0.001 $\mu$m up to 20 $\mu$m. The range, depending on application, is preferably from about 0.001 $\mu$m to about 10 $\mu$m, more preferably from about 0.001 to about 4 $\mu$m. In one embodiment, the tungsten carbide powder size is about 1.0 $\mu$m. Starting powder sizes of less than 20 $\mu$m should provide densified bodies having excellent properties.

Tungsten carbide powders having an average particle size of less than or equal to 10 $\mu$m are commercially available. One such powder, Teledyne type IV, has a nominal average particle size of 8 $\mu$m and includes a small amount of vanadium carbide as a grain growth inhibitor. Attriting such a powder simultaneously reduces the average particle size, reduces grain size distribution, and more uniformly disperses the grain growth inhibitor. Even in the absence of a grain growth inhibitor, attrition provides the benefits of smaller average particle size and a narrower particle size distribution. As an alternative, the WC powder may have these characteristics as synthesized. As a further alternative, powders with even larger average particle sizes may be used provided they are milled or attrited under conditions sufficient to reduce the average particle size to less than or equal to 0.2 $\mu$m. These powders necessarily require longer size reduction procedures and may, as a consequence, pick up additional quantities of impurities from media used to promote size reduction.

WC powders used in the present invention need not be 100% pure. They may contain very small amounts, e.g., less than 1.5 wt % by volume, of other materials so long as the other materials do not interfere with densification of the powder or adversely affect physical properties of resultant densified bodies. Examples of "other materials" include cobalt, iron, nickel, carbon and silicon. The other materials may, for example, be present as a result of powder synthesis procedures or as residue from milling operations. In some embodiments, cobalt is present from about 0.01% to 1.5% by volume. Preferably cobalt is present at about 0.25%. In addition to the other materials, the WC powders have an oxygen content that varies inversely with particle size. Thus, as particle size decreases, oxygen contents tend to increase. However, the oxygen content should be maintained at a level that does not interfere with densification of the powder or adversely affect physical properties of resultant densified bodies. In some embodiments a binder, e.g., wax is added to the powder to facilitate molding into the die. Preferably, the binder is less than about 5% by volume. More preferably the binder is about 2.25% by volume. Grain size can be controlled by careful control of densification procedures even if the WC powder does not include a grain growth inhibitor. Any conventional densification technique may be used provided it yields the densified ceramic body of the invention. Conventional techniques include pressureless or low pressure sintering, hot pressing, hot isostatic pressing and rapid omnidirectional compaction. Densification is preferably accomplished by hot isostatic pressing.

Hot pressing of essentially pure WC powders at temperatures less than or equal to 1,700° C. and pressures of 35 MPa has resulted in polycrystalline tungsten carbide bodies which are greater than 98.5% of theoretical density. Also, significant densification, (linear shrinkage of 9%) has been observed for essentially pure but agglomerated WC powders sintered without external pressures at 1,600° C. for 30 minutes in Ar. Such significant solid state sintering occurs in the absence of additives, although small percentages of an iron group element, e.g. cobalt, resulted in the attainment of closed porosity by pressureless sintering and near theoretical density (greater than 98% theoretical density). When such powders contain very small amounts of such additives are hot pressed at temperatures between about 1,400° C. and 2,000° C., the result in a fine grained microstructure with isolated pores. Preferably, the WC powders are pressed at about 1900° C. and about 50,000 psi.

Additionally, grain size can be controlled by very careful control of the processing conditions, especially sintering conditions, and by adding a small amount of a second phase which inhibits grain growth. Suitable grain growth inhibitors must be compatible with WC, eg., oxides, carbides, nitrides or borides. The free energy of oxides used as grain growth inhibitors must be lower than $WO_2$ and $WO_3$ (i.e. $AL_2O_3$, $ZrO_2$, $TiO_2$, $NbO$, $NbO_2$, $Nb_2O_5$, $Cr_2O_3$, $MgO$, $SiO_2$, $Ta_2O_3$, $MnO$, $ZnO$, $ThO_2$, $BeO$ etc.) Suitable carbides for controlling grain size must have free energies of formation less than WC (i.e. $VC$, $ThC_2$, $Cr_{23}$, $C_6$, $ZrC$, $TiC$, $SiC$, $Cr_3C_2$, etc.). Preferably, VC is added to the WC powder. Nitrides used as grain growth inhibitors must have free energies of formation less than $WN_2$, and WN (i.e., $ZrN$, $TiN$, $Th_3N_4$, $AlN$, $BN$, $NbN$, $VN$, $Si_3N_4$, $Cr_2N$, etc.). Similarly, borides must have energies of formation less than $WB_2$, WB, and $W_2B$, (i.e. $ZrB_2$, $TiB_2$ etc). Such grain growth inhibitors are present as less than about 1.5% by volume of the ceramic body with quantities less than about 1% volume percent being preferred, and about 0.35% by volume being especially preferred.

In all the above illustrations, it is necessary to realize that other interactions may also occur. For example, the addition of TiC, TIN, or TiG promotes the formation of cubic WC in solid solution with TiC, TIN or TiO and therefore changes the microstructure

EXAMPLE 1

Tungsten carbide powder (particle size of 1 micron), 0.35% VC and 2.25% wax was spray dried into a pressable powder. The powder was pressed in a cavity with punches and dies to have to form of the insert shape and chip breaker put into the ceramic body at the same time. The ceramic cutting insert was heated to 400° C. under argon to remove the wax binder. After all traces of wax binder was gone the insert was heated to 1900° C. until parts became dense. While maintaining temperature pressure (50,000 psi) was applied to remove porosity.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A ceramic cutting insert for high speed machining made of material consisting essentially of an iron group element between about 0.01% by volume and about 0.25% by volume, and polycrystalline tungsten carbide wherein the polycrystalline tungsten carbide has:

(a) a density of at least 95% of its theoretical density; and (b) an average grain size of 0.001 to 10 micrometers and wherein the cutting insert comprises:

(c) a cutting edge;

(d) a rake face with a chip control groove surface;

(e) a flank face;

wherein the cutting edge is formed at the juncture of the flank face and the rake face.

2. The ceramic cutting insert of claim 1, wherein the flank face is of a ground or molded condition.

3. The ceramic cutting insert of claim 1, wherein the chip control groove surface is of a ground or molded condition.

4. The ceramic cutting insert of claim 2, wherein the chip control groove surface and the flank face are each in a molded condition.

5. The ceramic cutting insert of claim 1, wherein the iron group element is selected from the group consisting of iron nickel and crobalt.

6. The ceramic cutting insert of claim 5, wherein the iron group element is cobalt.

7. The ceramic cutting insert of claim 6, wherein the cobalt is present at about 0.25% by volume.

8. The ceramic cutting insert of claim 1, further comprising a carbide, nitride, oxide and/or boride having a free energy of formation less than that of the respective carbide, nitride, oxide and/or boride of tungsten, present in the amount from about 0.1% to about 1% by volume.

9. A ceramic cutting insert for high speed machining with a chip control groove surface consisting essentially of polycrystalline tungsten carbide wherein an iron group element is present from about 0.01% by volume to about 0.25% by volume and the polycrystalline tungsten carbide:

(a) has a density of at least 98% of its theoretical density; and (b) an average grain size of 0.001 to 10 micrometers.

10. The ceramic cutting insert of claim 9, wherein the iron group element is selected from the group consisting of iron, nickel, and cobalt.

11. The ceramic cutting insert of claim 9, wherein the iron group element is cobalt.

12. The ceramic cutting insert of claim 11, wherein cobalt is present at about 0.25% by volume.

13. The ceramic cutting insert of claim 9, further comprising a carbide, nitride, oxide and/or boride having a free energy of formation less than that of the respective carbide, nitride, oxide and/or boride of tungsten, present in the amount from about 0.1% to about 1% by volume.

* * * * *